(12) United States Patent
Lewcun

(10) Patent No.: US 9,175,794 B2
(45) Date of Patent: Nov. 3, 2015

(54) DEVICE FOR CONNECTING MALE AND FEMALE PIPING

(75) Inventor: Patryk Lewcun, Bredaryd (SE)

(73) Assignee: NORMA SWEDEN AB, Anderstorp (SE)

( * ) Notice: Subject to any disclaimer, the term of this patent is extended or adjusted under 35 U.S.C. 154(b) by 741 days.

(21) Appl. No.: 12/735,003

(22) PCT Filed: Dec. 21, 2007

(86) PCT No.: PCT/SE2007/001161
§ 371 (c)(1),
(2), (4) Date: Jun. 9, 2010

(87) PCT Pub. No.: WO2009/082288
PCT Pub. Date: Jul. 2, 2009

(65) Prior Publication Data
US 2010/0253068 A1 Oct. 7, 2010

(51) Int. Cl.
*F16L 37/00* (2006.01)
*F16L 37/113* (2006.01)
(52) U.S. Cl.
CPC .................... *F16L 37/113* (2013.01)
(58) Field of Classification Search
CPC .................................................. F16L 37/113
USPC .......... 285/308, 314, 313, 376, 377, 401, 85, 285/88, 38, 921
See application file for complete search history.

(56) References Cited

U.S. PATENT DOCUMENTS

| | | | | |
|---|---|---|---|---|
| 2,463,179 A | * | 3/1949 | Iftiger, Sr. .......................... | 285/34 |
| 4,298,220 A | * | 11/1981 | Kukuminato ............ | 285/148.26 |
| 4,842,309 A | * | 6/1989 | LaVene et al. ................ | 285/319 |
| 4,875,709 A | * | 10/1989 | Caroll et al. ..................... | 285/14 |
| 5,472,242 A | | 12/1995 | Petersen | |
| 5,511,827 A | | 4/1996 | Steinkamp et al. | |
| 5,607,190 A | | 3/1997 | Exandier et al. | |

(Continued)

FOREIGN PATENT DOCUMENTS

| | | |
|---|---|---|
| EP | 1 682 810 | 5/2008 |
| GB | 2288646 | 10/1995 |

(Continued)

OTHER PUBLICATIONS

Russian Decision on Grant dated Apr. 30, 2011, issued in Application 2010130318 and English Translation thereof.

(Continued)

*Primary Examiner* — David E Bochna
*Assistant Examiner* — James Linford
(74) *Attorney, Agent, or Firm* — Harness, Dickey & Pierce, P.L.C.

(57) ABSTRACT

A device for connecting male and female piping or tubing, where the female pipe includes an inner wall portion with a first holding section positioned at the inner periphery of the female pipe. The male pipe includes a sleeve with a second holding section positioned on the outer periphery of the male pipe, The device includes a ring-shaped element arranged between the male/female pipes. The ring-shaped element includes at least one axially protruding resilient tongue with a first device engaging the first holding section of the female pipe, and a second device configured to resiliently snap into a holding position within the second holding section of the male pipe when inserting the male pipe into the ring-shaped element and the female pipe.

19 Claims, 2 Drawing Sheets

(56) References Cited

U.S. PATENT DOCUMENTS

| | | | |
|---|---|---|---|
| 5,697,652 A * | 12/1997 | Nishikawa | 285/314 |
| 5,741,084 A * | 4/1998 | Del Rio et al. | 403/349 |
| 6,467,817 B1 | 10/2002 | Rhyman | |
| 6,517,120 B1 * | 2/2003 | Miyajima et al. | 285/305 |

FOREIGN PATENT DOCUMENTS

| | | |
|---|---|---|
| JP | 2000310384 A | 11/2000 |
| JP | 2007511718 A | 5/2007 |
| RU | 2213899 | 10/2003 |
| RU | 2284310 | 9/2006 |
| WO | WO 00/09934 | 2/2000 |
| WO | WO-2005047753 A1 | 5/2005 |
| WO | WO 2009/082288 | 7/2009 |

OTHER PUBLICATIONS

Chinese office Action dated May 12, 2011 for Application 200780101919.8.

International Search Report for International Application No. PCT/SE2007/001161 mailed on Aug. 28, 2008.

English language translation of Japanese Office Action dated Sep. 18, 2012 for corresponding Japanese Application No. 2010-539350.

* cited by examiner

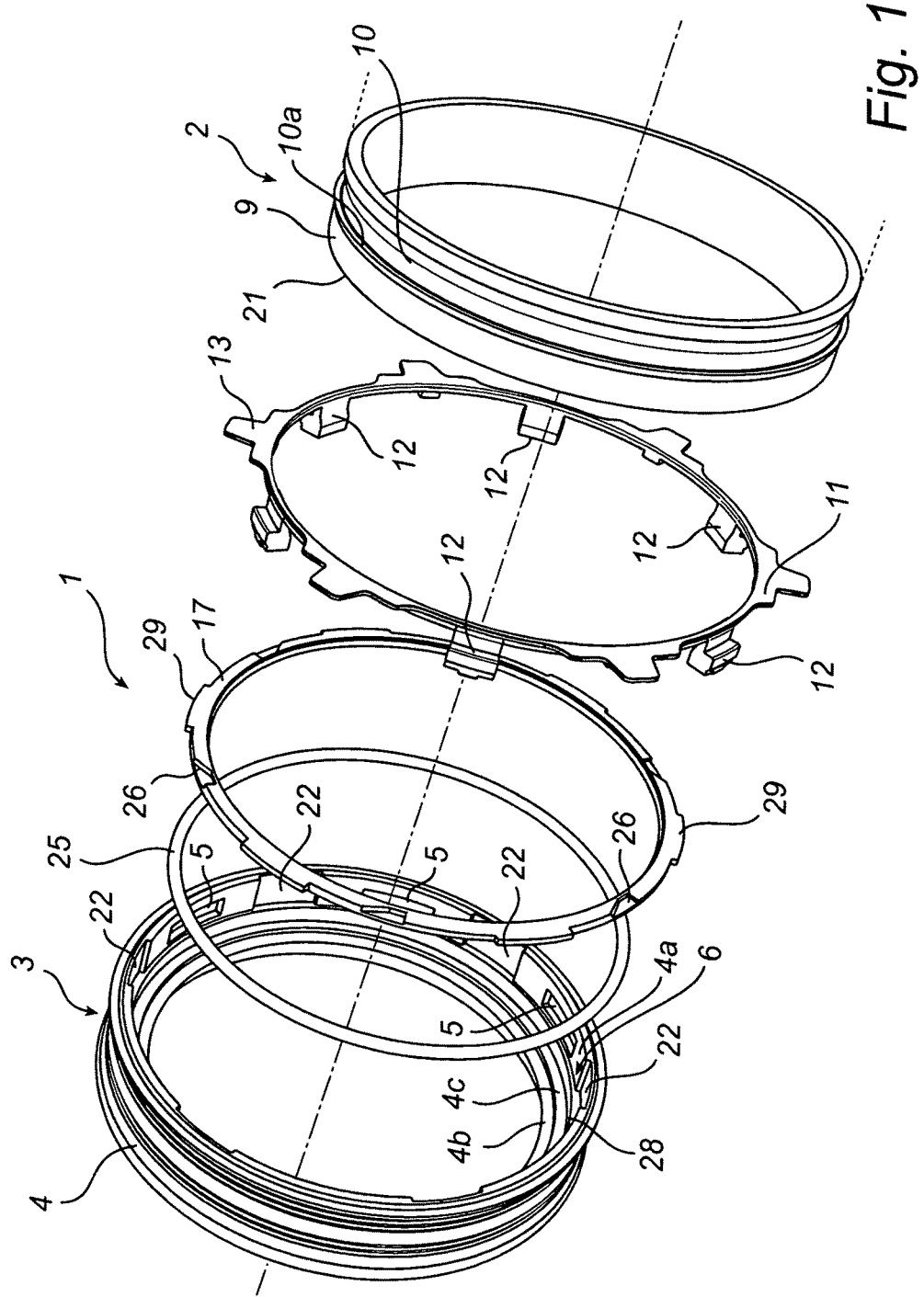

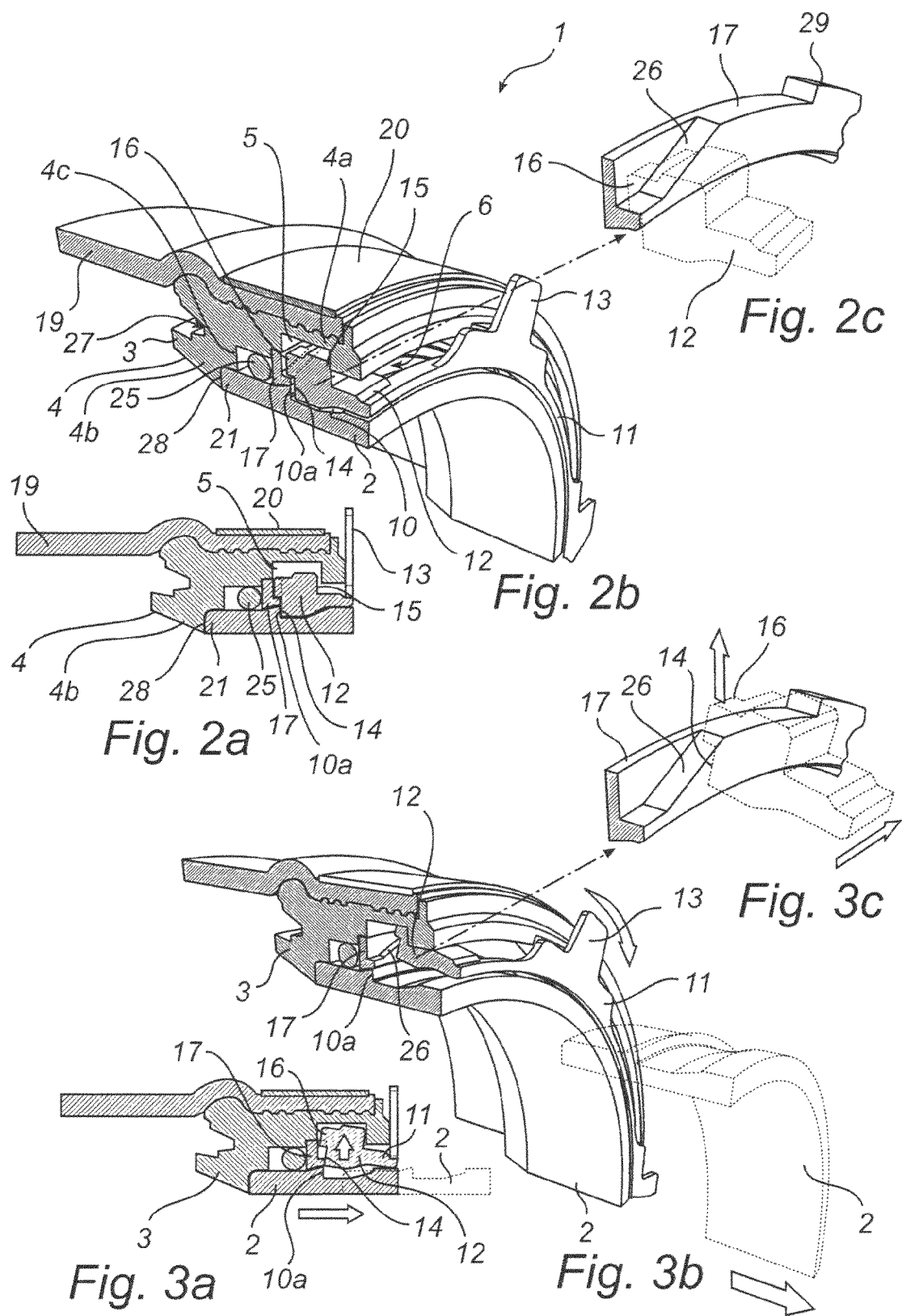

DEVICE FOR CONNECTING MALE AND FEMALE PIPING

FIELD OF THE INVENTION

The present invention relates to a device for connecting two rigid objects, wherein said two rigid objects comprise a male part and a female part, which are interconnectable.

BACKGROUND ART

In automotive industry, municipal heating networks, ventilation industries and plumbing it is needed to connect pipes, tubes etc. in a fast and air tight way. These connections often have to bear different kind of fluids and pressures since they may be used in different areas, for example the connections may be used to assembly tanks and canisters. It is known to connect two tubes to each other in many different ways. A flexible tube may be arranged via a connecting part to a second flexible tube or directly to a rigid pipe with for example a hose clamp. Rigid pipes or tubes may be connected to each other via other connecting parts known in the art.

A device of interconnecting two rigid tubular objects is known from WO00/09934. This device can be used to interconnect two rigid objects, such as two tubes, which are made of a rigid, non-elastic material.

However, there is always a need to further develop a device for connecting two rigid objects, in order to make them less space demanding, cost effective and to improve the security of correct mounting etc.

SUMMARY OF THE INVENTION

The object of the present invention is to provide an alternative coupling device, which can be used to interconnect two rigid, preferably tubular, objects, such as two rigid tubes in a correct and fast manner.

According to the invention, this object is achieved by a device for connecting two rigid objects, wherein said two rigid objects comprise a male part and a female part, which are interconnectable. Said female part comprises an inner wall portion with at least one first holding section positioned at the inner periphery of said female part and said male part comprises of a sleeve with at least one second holding section positioned on the outer periphery of said male part, a ring-shaped element being arranged to be placed between the parts when inserting said male part into said female part through an opening, said ring-shaped element being provided with at least one axial protruding resilient tongue having a first means being arranged to engage said first holding section of said female part when inserting said ring-shaped element into said female part, and/or said resilient tongue further having a second means being arranged to resiliently snap into a holding position at said second holding section of said male part when inserting said male part into said ring-shaped element and said female part. A ring-shaped element which is used for engaging the male part with the female part makes it possible to get a very short connecting device, which is an advantage in space demanding environments for example in vehicles. A ring-shaped element is an element with a minimal extension in the axial direction. It do not have to have a circular shape, it may have any other shape suitable for the application, for example oval or hexagonal.

Preferably, said second holding section is a transverse edge on said male part, which continues peripherally around the whole outer side of the male part. Alternatively, said second holding section is a recess on said male part, which continues peripherally into and around the whole outer side of said male part. By letting a transverse edge/recess continue around the whole circumferential of the male part, it does not matter in which direction the male part is mounted into the female part. It is always in the right direction. This reduces the mounting time, since the user do not have to position it in a certain direction to find the right securing position.

Preferably, adjacent to said first holding section of said female part is arranged at least one disengagement element having a radially acting wedge portion on which said resilient tongue runs, which allows separation of said female part and said male part when turning said ring-shaped element with a predetermined force relatively to said male and female part to a position where said second means of said resilient tongue is placed, by running said resilient tongue on said wedge portion, radially outside said second holding section of said male part, so that said resilient tongue is kept in this position until said turning force is relived and said resilient tongue automatically returns to its originally position. This is an easy way to disengage the female part from the male part. Only the ring-shaped element has to be turned. The female part and the male part may remain in their mounting positions. Since the resilient tongues always return to their originally position they are always in position ready to secure the male part to the female part.

Preferably, said disengagement element is arranged inside said female part adjacent said first holding section so that said disengagement element allows said ring-shaped element and said male part to be inserted. This allows the whole system to be as small as possible. Said disengagement element may be part of said female part. Consequently, no necessary parts are needed.

Alternatively, said disengagement element is a separate ring-shaped disengagement element which is being arranged to be placed between the parts when inserting said male part into said female part before said ring-shaped element is being arranged. A ring-shaped disengagement element is an element with a minimal extension in the axial direction. It do not have to have a circular shape, it may have any other shape suitable for the application, for example oval or hexagonal. By having a separate ring-shaped disengagement element it is easy and cheap to manufacture the female part and the disengagement element.

Said first means of said resilient tongue may consist of a stop lug projecting from the outer wall thereof and said second means of the resilient tongue may consist of a stopping edge extending inwards from the inner wall thereof. Stop lugs and stopping edges are easy fixing means.

Preferably, the ring-shaped element has at least one outwardly protruding means, which indicates by being arranged close to said opening of the said female part when said stop lug of said resilient tongue engages said first holding section of said female part. The outwardly protruding means may abut or almost abut against the end of the female part where the opening is and thereby indicating that the ring-shaped element is mounted in a correct position axially.

At least part of said outwardly protruding means may be protruding outside the radial dimensions of said female and/or male part. By letting the protruding means protrude outside the system the protruding means may work as a grip for turning the ring-shaped element, when separating the male part from the female part.

Preferably, said female part together with said disengagement element creates a space where a gasket is arranged to sealingly abut against the inside of said female part and against the outer wall of said male part. This ensures that the system is leak tight.

Said gasket may be an O-ring. An O-ring is a cheap gasket, which may be bought of the shelf.

Said female part at the opposite end from the opening may be connected to or constitutes part of a third element and said male part at the opposite end from the one inserted into said female part is connected to or constitutes part of a fourth element. Said third and/or fourth element may be a flexible tubular object and said third and/or fourth element may be a rigid object.

At least one of said two rigid objects may be tubular.

Generally, all terms used in the claims are meant to be interpreted according to their ordinary meaning in the technical field, unless explicitly defined otherwise herein. All references to "a/an/the [element, device, component, means, step, etc]" are meant to be interpreted openly as referring to at least one instance of said element, device, component, means, step, etc., unless explicitly stated otherwise. The steps of any method disclosed herein do not have to be performed in the exact order disclosed, unless explicitly stated.

Other objectives, features and advantages of the present invention will appear from the following detailed disclosure, from the attached dependent claims as well as from the drawings.

BRIEF DESCRIPTION OF THE FIGURES

The invention will now be described in more detail with reference to the accompanying schematic Figures, which by way of example illustrate currently preferred embodiments of the coupling device according to the pre-sent invention.

FIG. 1 is an exploded view of the coupling device according to a first embodiment.

FIG. 2a is a partial cross-sectional view of the device according to FIG. 1 in a connected state.

FIG. 2b is a partial cross-sectional view in perspective of the device according to FIG. 1 in a connected state.

FIG. 2c is a view in perspective of a part of the device according to FIG. 1 in a connected state.

FIG. 3a is a partial cross-sectional view of the device according to FIG. 1 in a state to be disconnected.

FIG. 3b is a partial cross-sectional view in perspective of the device according to FIG. 1 in a state to be disconnected.

FIG. 3c is a view in perspective of a part of the device according to FIG. 1 in a state to be disconnected.

DESCRIPTION OF PREFERRED EMBODIMENTS

FIG. 1 shows the coupling device in an exploded view and FIG. 2a-2c shows the coupling device in an assembled state. All these figures will together be explained below.

FIG. 1 and FIGS. 2a-2c show a preferred embodiment of the coupling device 1 for connecting two rigid objects, which are a female part 3 and a male part 2, whose main components comprise sleeves 4, 9, which both can be made, for instance, in the form of a tube of a rigid, non-elastic material, for example plastic or metal. Both rigid objects are in this embodiment tubular, however they are not limited to this shape. The female part do not have to be a sleeve, it may be an opening/hole in a part, which is to be connected. As is evident from FIG. 1 and FIG. 2a-2b, the female part 3 has at its mouth 6, also called opening, a mouth portion 4a with an inner diameter larger than the remaining portion 4b of the female part, the transition between these two portions being designated 4c. As is evident from FIG. 1, several first holding sections 5, here in form of recesses 5, are arranged radially close to the mouth 6 of the female part 3 at the same distance from the mouth/opening 6 and evenly distributed peripherally around the inside of the female part 3. However, the distance may differ and the distribution may be uneven. The holdings sections do not have to be a recess it may for example be an transversally protruding element. The amount of first holding sections 5 are not limited to a certain number, it may for example be only one. At its end (not shown) opposite the opening 6, the female part 3 is provided with, for instance, a threaded portion which is intended to be screwed into a first rigid tube (not shown) or is formed integrally therewith, or a flexible elastic tube 19 (FIG. 2a, 2b) may be arranged on the outside of the female part and fixed with for example with a crimped band 20, or a tube may be welded to the opposite end of the opening 6. A recess 27 is formed into the end in order to provide a welding area for the tube.

The male part 2, consists of a sleeve 9 which at one of its ends may be provided with a threaded portion that is intended to be screwed into a second rigid tube (not shown). Alternatively, the male part may consist of a tube portion, which is integrated in a unit such as a cooler (not shown) or the male part may be directly connected to a part, for example a motor (not shown). In these figures the male part is not connected to anything. The male part 2 is in its outer wall provided with a second holding section 10, here a transverse edge 10a which is arranged at a distance from the end surface 21 of the other end, which may be connected to other objects. The transverse edge 10a continues around the whole male part 2, may however be several edges distributed evenly or unevenly around the male part. This transverse edge 10a may, for instance, be formed by removing material by milling in the outer wall. It may also be formed by pressing the material, milling the material or, if the male part 2 is made of plastic, be formed by injection moulding of the male part. The female part 3 has in its transition, between the two portions 4a, 4b, which is designated 4c a stopping edge 28 (see FIG. 2a, 2b), which may act as a stop for the male part 2 during insertion. Alternatively, means (not shown) protruding radially outwards on the male part can be arranged as a stop if they are arranged in position where they will abut against the end of the female part 3 where the mouth/opening 6 is or to any possible between lying part in a mounted position. A ring-shaped element 11 is arranged to be placed between the parts 2, 3 when inserting the male part 2 into the female part 3, the ring-shaped element 11 being provided with axial protruding resilient tongues 12. A ring-shaped element is an element with a minimal extension in the axial direction. The resilient tongues 12 are evenly distributed around the periphery, however it is not limited to this. The number of axially protruding resilient tongues is not limited to a certain number, it may be only one or several. As is better seen in FIGS. 2a and 2b, each resilient tongue 12 is provided with a thickened portion at its free outer end to form a stop lug 15, respectively, projecting from the outer wall of the element. The stop lugs 15 are arranged to resiliently engage the recesses 5 of the female part 3, when inserting the ring-shaped element 11 into the female part 3. The free outer end of each resilient tongue 12 forms, at its side abutting against the transverse edge 10a of the male part 2, a stopping edge 14, extending inwards from the inner wall of the element. The stopping edges 14 are arranged to resiliently snap into a holding position with the transverse edge 10a of the male part when inserting the male part into the ring-shaped element 11 and the female part 3. The resilient tongues are in a central position, i.e. not under tension before and after the male part have been arranged. The female part 3 and male part 2 are not possible to disengage without any further action.

The ring-shaped element 11 is further provided with an outwardly protruding means 13 which is arranged to be positioned close to the opening 6 of the female part 3 when the resilient tongues 12 and stop lugs 15, respectively, engage the respective recesses 5 in the female part 31. The means 13 is protruding outside the outer dimensions of the male part 2 and the female part 3 and acts like a gripping part, for turning the ring-shaped element 11 in order to separate the male part 2 from the female part 3 with the aid of a disengagement element. The ring-shaped element 11 may be made of metal or plastic.

A second ring-shaped means 17, which has the function as a disengagement element, is also arranged is to be placed between the parts when inserting the male part 2 into the female part. However the ring-shaped disengagement element 17 is arranged closer to the remaining portion 4b than the ring-shaped element 11. The ring-shaped disengagement element 17 is arranged adjacent the edge of recess 5, which is closer to the opposite end of the opening 6 of the female part 3 and is having radially acting wedge portions 26 (see FIG. 2c), arranged to each resilient tongues 12, on which the resilient tongue 12, here only a top part 16 of the resilient tongue runs, which allows separation of the female part 3 and the male part 2 when turning the ring-shaped element 11. Here the ring-shaped disengagement means 17 is a separate part, which may be loosely, or fixed arranged inside the female part 3 and it may be made of metal or plastic. However the disengagement means 17 may be integrated into the female part 3. The ring-shaped disengagement element 17 is an element with a minimal extension in the axial direction.

A gasket, here an O-ring 25 (may however, be any other gasket known in the art), is further arranged in the transition 4c between the first portion 4a of the sleeve and its remaining portion 4b so as to sealingly abut against the outer wall of the male part 2 and the ring-shaped disengagement element 17 in the connected state of the device 1.

It is also evident from FIGS. 2a and 2b that the outer diameter of the male part 2 along a portion where the female part 3 and the male part 2 overlap each other, is slightly smaller, at least over most of the portion, than the inner diameter of both the ring-shaped element 11 and the remaining portion 4b, and that the length of this portion exceeds the length of the first portion 4a of the female part, which results in said other end 21 of the male part extending a distance into the remaining portion 4b of the sleeve until it abut with the stopping edge 28 in the transition 4c. When female part 3 is to be connected to the male part 2 they are first attached to the respective tubes unless they are formed as an integral part of the tubes. Then the O-ring 25 is placed in the transition 2c. Subsequently, the ring-shaped disengagement element 17 and the then the ring-shaped element 11 is inserted into the female part 1, its resilient tongues 12 being placed in such a manner relative to the recesses 5 of the female part that the stop lugs 15 engage the recesses 5. In the female part 3, grooves 22 are arranged (see FIG. 1) in the axial direction, which ensure correct assembly of the ring-shaped disengagement element 17. The ring-shaped disengagement element 17 has protruding parts 29, which fit into these grooves 22. There will thus be a clear visual indication of the female part and the elements being interconnected correctly. Then the male part 2 is inserted into the ring-shaped element 11 and the female part 3, so far that the stopping edges 14 of the resilient tongues 12 snap into a holding position with the transverse edge 10a of the male part 2 and thus lock the male part 2 to the ring-shaped element 11, which is locked to the female part.

The coupling of the female part 3 and the male part 2 thus constitutes a quick coupling. It is also important to notice that in the present coupling device axial forces arising in connection with use cause a downward turning of the outer end of the resilient tongue towards the male part, which means that the higher the axial force, the better the locking of the resilient tongue to the female and male part.

FIGS. 3a and 3b shows how the separation of the male part 2 and the female part 3 may be performed. The ring-shaped element 11 have been turned by its means 13 with a predetermined force relative to the male 2 and female part 3 to a position where the second means (protrusion) 14 of the resilient tongue 12 is moved to a position radially outside the transversal edge 10a of the male part 2 by letting the top part 16 of the resilient tongue 12 slid on the radially acting wedge portion 26 of the ring-shaped disengagement element 17, so that the resilient tongue is resiliently kept in this position (see FIG. 3c). The resilient tongue may itself slid on the radially acting wedge portion 29, instead of its top part. The male part 2 and the female part 3 may now be separated by moving the parts axially away from each other. When the male part is removed and the ring-shaped element 11 is not longer under a turning force the resilient tongues 12 will automatically return to their originally position and they are then ready to engage with a male part 2.

Although the present invention has been described in connection with particular embodiments thereof, it is to be understood that various modifications, alterations and adaptations may be made by those skilled in the art without departing from the spirit and scope of the invention.

The invention claimed is:

1. A device, comprising:
a female part;
a male part insertable into the female part;
said female part including an inner wall portion defming at least one first holding section that is an arcuate groove positioned along an inner periphery of said female part,
said male part including a sleeve with at least one second holding section positioned on an outer periphery of said male part; and
a ring-shaped element, with an axially protruding resilient tongue arranged to be placed between the male and female parts when inserting said male part into said female part through an opening, said resilient tongue including at least one arcuate, radially protruding stop lug extending from an outer periphery of the resilient tongue, the stop lug being configured to extend radially outwardly to insert into said arcuate groove of said female part when inserting said ring-shaped element into said female part, and a protrusion, extending from the resilient tongue and arranged to resiliently snap into a holding position at said second holding section of said male part when inserting said male part into said ring-shaped element and said female parts;
at least one disengagement element positionable adjacent to the first holding section between the male part and female part, the at least one disengagement element including an outwardly facing radially acting wedge portion,
the resilient tongue being configured to slide from a first position along an inner circumference of the female part and an outer circumference of the male part to a second position via the application of a turning force, movement of the resilient tongue from the first position to the second position causing a top part of the resilient tongue to contact and slide across the wedge portion to cause the resilient tongue to pivot and separate said female part from said male part,
the radially acting wedge portion being configured to cause the resilient tongue to return to the first position from the second position automatically if the turning force is no longer applied to the resilient tongue, wherein said disengagement element is not integrally formed with the ring-shaped element, the disengagement element being insertable between the male and female parts prior to insertion of said ring-shaped element between the male and female parts during engagement of the male part within the female part.

2. Device according to claim 1, wherein a transverse edge on said male part exists around the entire periphery of said male part in order to define the second holding section.

3. Device according to claim 1, wherein said male part defines a recess that exists around the entire periphery of said male part, the recess being the second holding section.

4. Device according to claim 1, wherein said disengagement element is arranged inside said female part adjacent said first holding section so that said disengagement element allows said ring-shaped element and said male part to be inserted.

5. Device according to claim 4, wherein said disengagement element is part of said female part.

6. Device according to claim 1, wherein said disengagement element is part of said female part.

7. Device according to claim 1, wherein said second device of said resilient tongue consists of a stopping edge extending inwards from the inner wall thereof.

8. Device according to claim 1, wherein the ring-shaped element includes at least one outwardly protruding device, the outwardly protruding device being rotatable in order to cause the ring-shaped element to slide between the male part and the female part and force said stop lug of said resilient tongue into said first holding section to separate the male part from the female part.

9. Device according to claim 8, wherein at least part of said outwardly protruding device protrudes outside the axial dimensions of at least one of said female part and said male part.

10. Device according to claim 1, wherein the female part and the disengagement element define a space capable of holding a gasket to sealingly abut against the inside of said female part and against an outer wall of said male part.

11. Device according to claim 10, wherein said gasket is a O-ring.

12. Device according to claim 1, wherein a proximal end of the female part is connected to a third element, the proximal end being an end of the female part that is furthest from a distal end of the female part which forms the opening.

13. Device according to claim 1, wherein a proximal end of said male part is connected to a fourth element, the proximal end being an end of the male part nearest the opening when the male part is fully inserted into the female part.

14. Device according to claim 13, wherein at least one of said third element and said fourth element is a flexible tubular object.

15. Device according to claim 13, wherein at least one of said third element and fourth element is a rigid object.

16. Device according to claim 1, wherein at least one of said two rigid objects is tubular.

17. Device according to claim 1, further comprising:
a protruding device connected to an axial end of the resilient tongue,
the protruding device outwardly and radially extending from an outer periphery of the ring-shaped device,
the protruding device positioned near the opening of the female part when said stop lug is inserted into the arcuate groove of the female part.

18. Device according to claim 17, wherein the protruding device extends radially beyond an outer most surface of the male part when said stop lug is inserted into the arcuate groove of the female part.

19. Device according to claim 17, wherein the protruding device extends radially beyond an outer most surface of the female part when said stop lug is inserted into the arcuate groove of the female part.

* * * * *